US012668437B2

(12) United States Patent
Dalipaj

(10) Patent No.: US 12,668,437 B2
(45) Date of Patent: Jun. 30, 2026

(54) GRIPPING DEVICE FOR CRATES

(71) Applicant: SYSTEM LOGISTICS S.P.A., Fiorano Modenese (IT)

(72) Inventor: Erion Dalipaj, Rubiera (IT)

(73) Assignee: SYSTEM LOGISTICS S.P.A., Fiorano Modenese (IT)

( * ) Notice: Subject to any disclaimer, the term of this patent is extended or adjusted under 35 U.S.C. 154(b) by 229 days.

(21) Appl. No.: 18/294,250

(22) PCT Filed: Aug. 1, 2022

(86) PCT No.: PCT/IB2022/057121
§ 371 (c)(1),
(2) Date: Feb. 1, 2024

(87) PCT Pub. No.: WO2023/012639
PCT Pub. Date: Feb. 9, 2023

(65) Prior Publication Data
US 2024/0343505 A1      Oct. 17, 2024

(30) Foreign Application Priority Data

Aug. 6, 2021     (IT) ......................... 102021000021458

(51) Int. Cl.
*B65G 61/00*          (2006.01)
*B25J 15/00*          (2006.01)
(52) U.S. Cl.
CPC .......... *B65G 61/00* (2013.01); *B25J 15/0047* (2013.01); *B65G 2201/025* (2013.01)
(58) Field of Classification Search
CPC .. B25J 15/0047; B25J 15/0071; B25J 15/009; B65G 61/00; B65G 2201/025
See application file for complete search history.

(56) References Cited

U.S. PATENT DOCUMENTS

2014/0142751 A1*   5/2014   Takizawa ............... B25J 9/0093
                                                        700/245
2017/0120453 A1*   5/2017   Roy ........................... B25J 5/04

FOREIGN PATENT DOCUMENTS

DE        2932632 A1      2/1980
EP        0366943 B1     11/1992
EP        1847491 A1     10/2007

OTHER PUBLICATIONS

International Search Report and Written Opinion from PCT Application No. PCT/IB2022/057121, Date of the actual completion of the international search: Oct. 24, 2022, Date of mailing of the international search report: Nov. 22, 2022, 11 pages.

* cited by examiner

*Primary Examiner* — Gerald McClain
(74) *Attorney, Agent, or Firm* — Chrisman Gallo Tochtrop LLC

(57) ABSTRACT

Gripping device for crates having a first abutment and a second abutment in contact with two panels of a crate that are adjacent and perpendicular to one another. A first presser, in the active position, is able to press on the free edge of the first panel, exerting an operating thrust along at least the main direction, and a second presser, in the active position, is able to press on the free edge of the second panel, exerting an operating thrust along at least the main direction. A first cursor, in the operating position, is able to engage with the first panel, to prevent a movement of the first panel along the main direction, and a second cursor, in the operating position, is able to engage with the second panel, to prevent a movement of the second panel along the main direction.

9 Claims, 6 Drawing Sheets

GRIPPING DEVICE FOR CRATES

The present invention relates to a gripping device for crates, in particular, but not exclusively, for gripping crates of the type commonly used in the distribution of fruit and vegetables.

Gripping devices are currently available for crates, which are typically used in fruit and vegetable distribution centres. Such centres receive the products collected in crates, which are positioned on pallets coming from the producers or from other distribution centres.

Each incoming pallet can be of homogeneous type, or be formed by crates containing the same product, or can be formed by crates containing different products.

The function performed in the distribution centres is normally that of making up outgoing pallets formed by crates collected from different incoming pallets, for example to respond to specific orders received from sales points, supermarkets or other places.

In order to perform this function, the distribution centres are provided with equipment that comprises one or more gripping devices, structured to pick up the crates from the incoming pallets and deposit the crates on one or more outgoing pallets. The gripping devices are controlled by a central computer that operates on the basis of the orders received.

Currently available gripping devices have several drawbacks.

First of all, in many cases they are able to collect and manage only one crate at a time. This reduces significantly the productivity of the distribution centre. Further, the incoming pallets often need to be dismantled so as to destack the various crates to make the crates available to the gripping devices. This need entails greater cost and time for dismantling the incoming pallets.

The object of the present invention is to provide a gripping device that enables the drawbacks of the currently available gripping devices to be obviated.

One advantage of the gripping device according to the present invention is that it enables several crates that are stacked together on an incoming pallet to be collected simultaneously.

Another advantage of the gripping device according to the present invention is being able to operate directly on the incoming pallets without the need to destack the incoming crates.

Additional features and advantages of the present invention will become more apparent from the following detailed description of an embodiment of the invention, illustrated by way of non-limiting example in the appended figures, in which.

Figure 1:
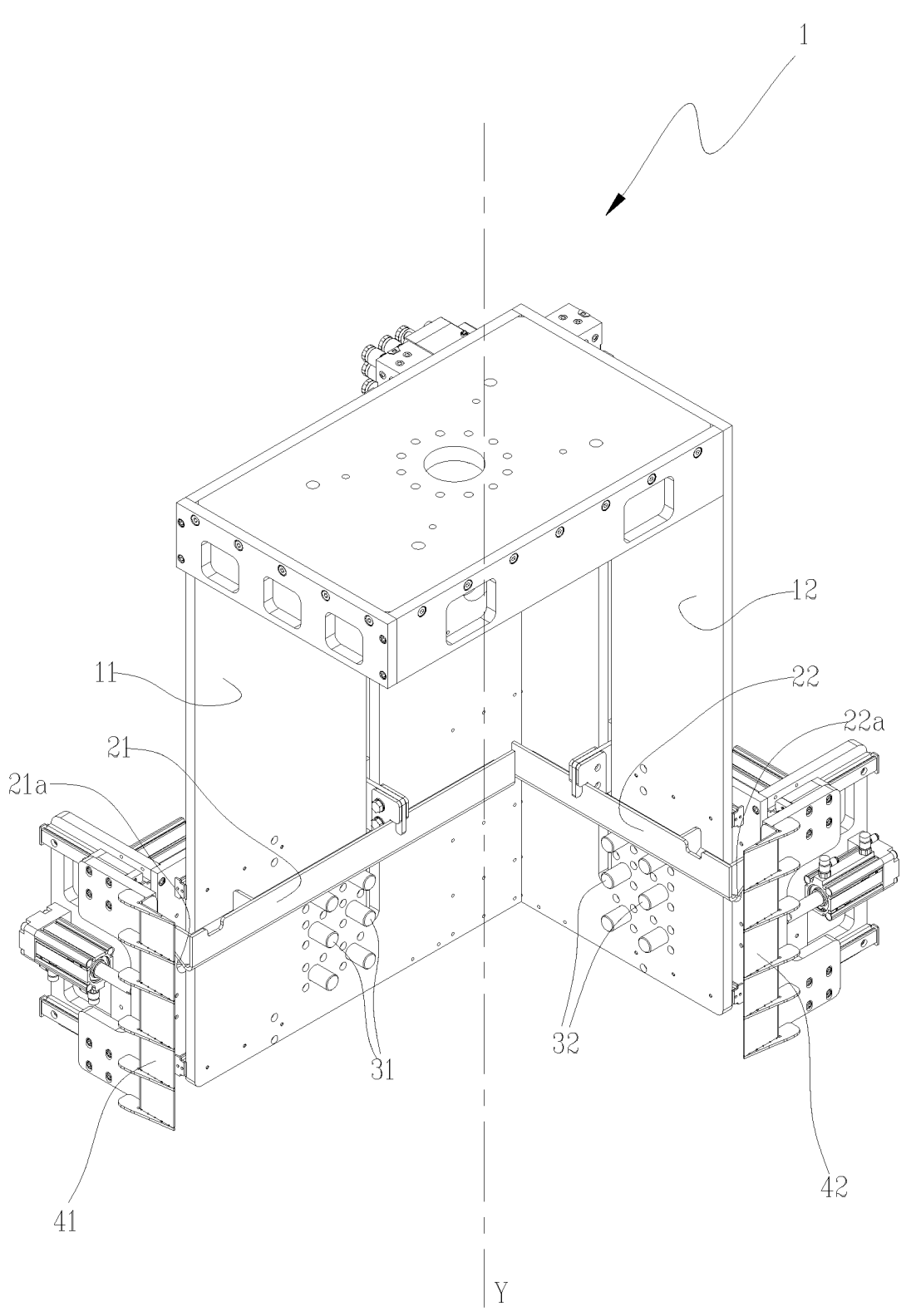
FIG. 1 shows an axonometric schematic view of the gripping device according to the present invention.

The gripping device (1) for crates according to the present invention is particularly useful for gripping and releasing crates, for example of the type commonly used in the distribution of fruit and vegetables.

In the appended figures, the crates (C) are shown schematically, in some cases transparently, to better show the gripping device (1).

A crate (C) comprises a bottom wall, with a substantially rectangular perimeter, with which four panels (c1,c2,c3,c4) are associated, arranged substantially orthogonally to the bottom wall and on the same side as the latter, to delimit a containing space for the products. Two opposite panels are substantially parallel to one another. Two adjacent panels are perpendicular to one another, i.e. they define together a substantially right angle. Each panel has a free edge, located on the opposite side to the joint with the bottom wall. The free edges of the panels (c1,c2,c3,c4) delimit an opening of the crate that in use faces upwards.

Each panel comprises a handle (m1,m2,m3,m4), typically in the form of a through opening.

The gripping device (1) is suitable for being associated with a robotic arm or with another movement device, in order to be able to move within a manoeuvring space in which a plurality of crates (C) can be located possibly stacked vertically together in one or more stacks.

The gripping device for crates according to the present invention comprises a first abutment (11) and a second abutment (12), arranged to be positioned in contact with two panels (c1,c2) of a crate (C) that are adjacent and perpendicular to one another.

Preferably, the first and the second abutment (11,12) each define a support surface parallel to a main direction (Y). In conditions of normal use of the gripping device, the main direction (Y) is substantially vertical. Preferably, the two abutments (11,12) are perpendicular to one another, forming overall an L-shaped abutment that is suitable for being positioned in contact with two panels (c1,c2) of a crate (C) that are adjacent and orthogonal to one another.

Figure 2:
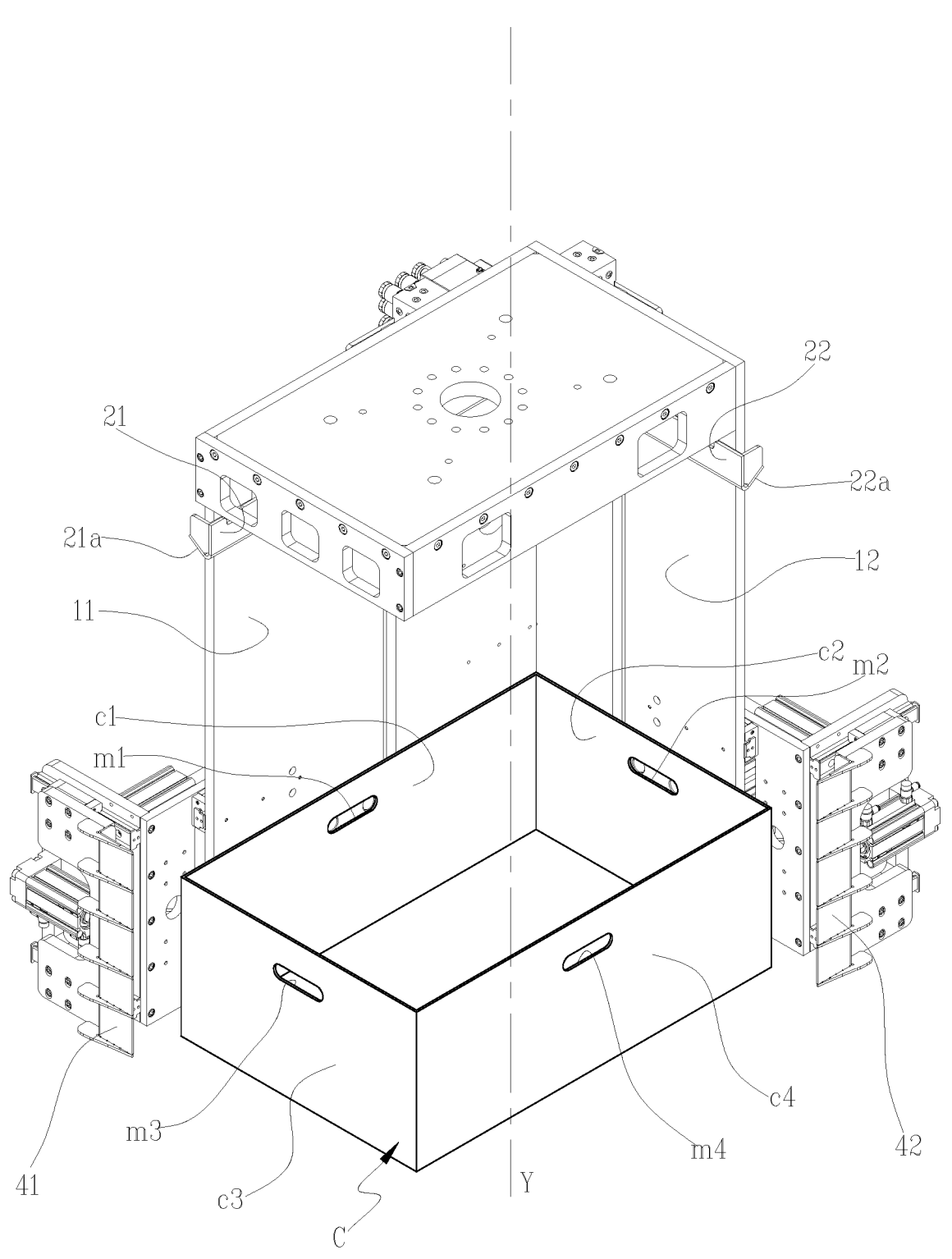
FIGS. 2, 3, 4, 5 show different configurations implemented in succession to grip a crate.
Figure 3:
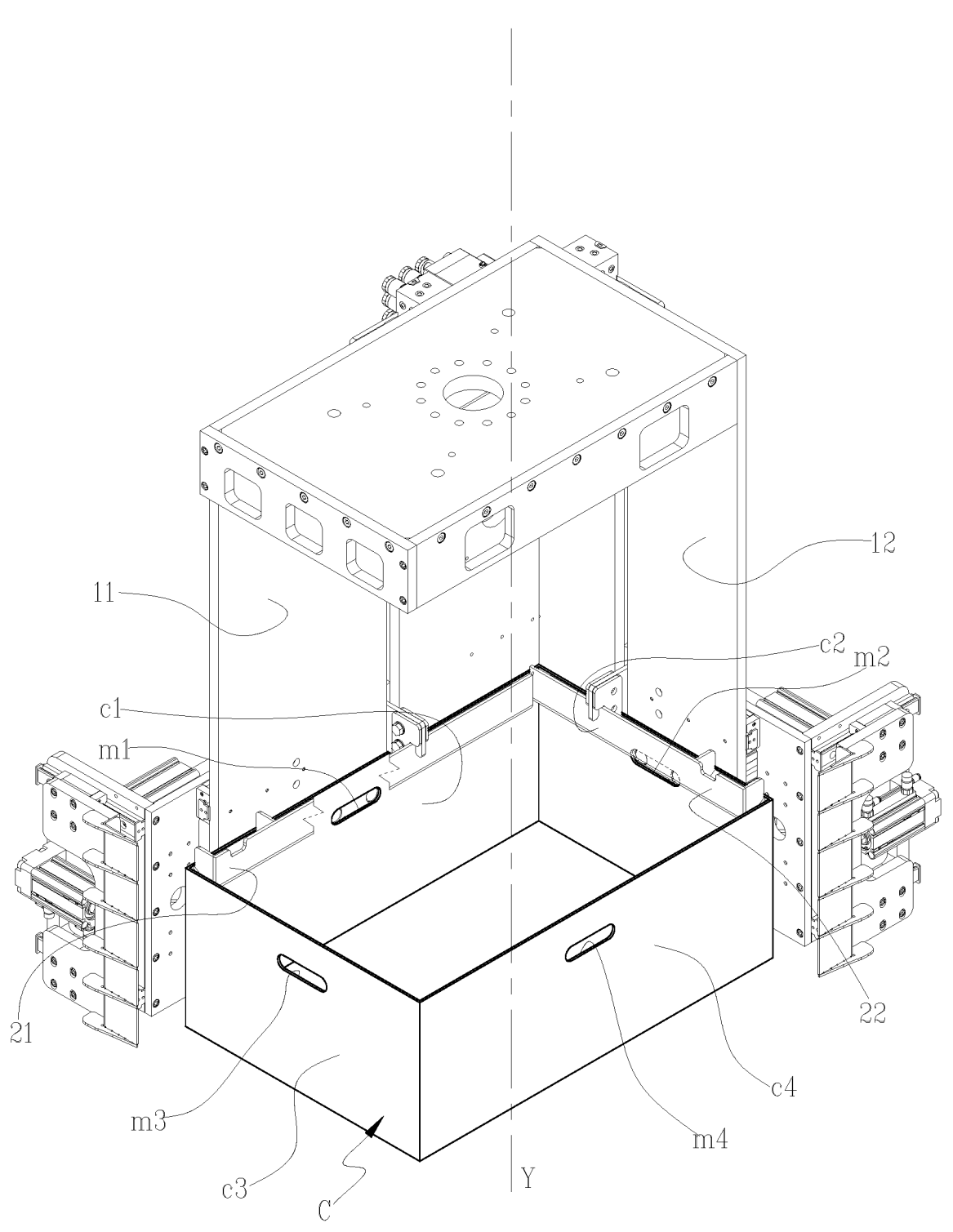
Figure 4:
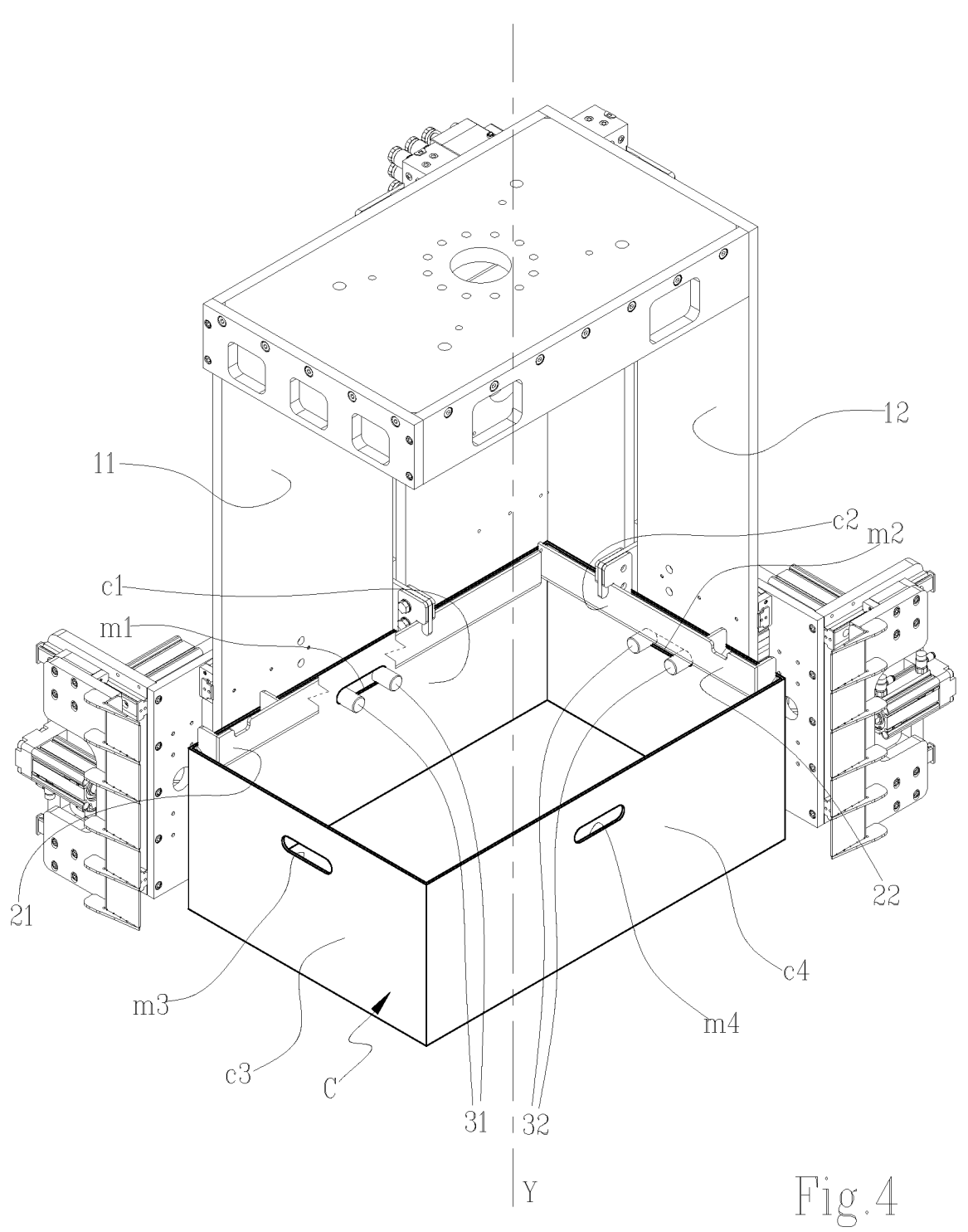
Figure 5:
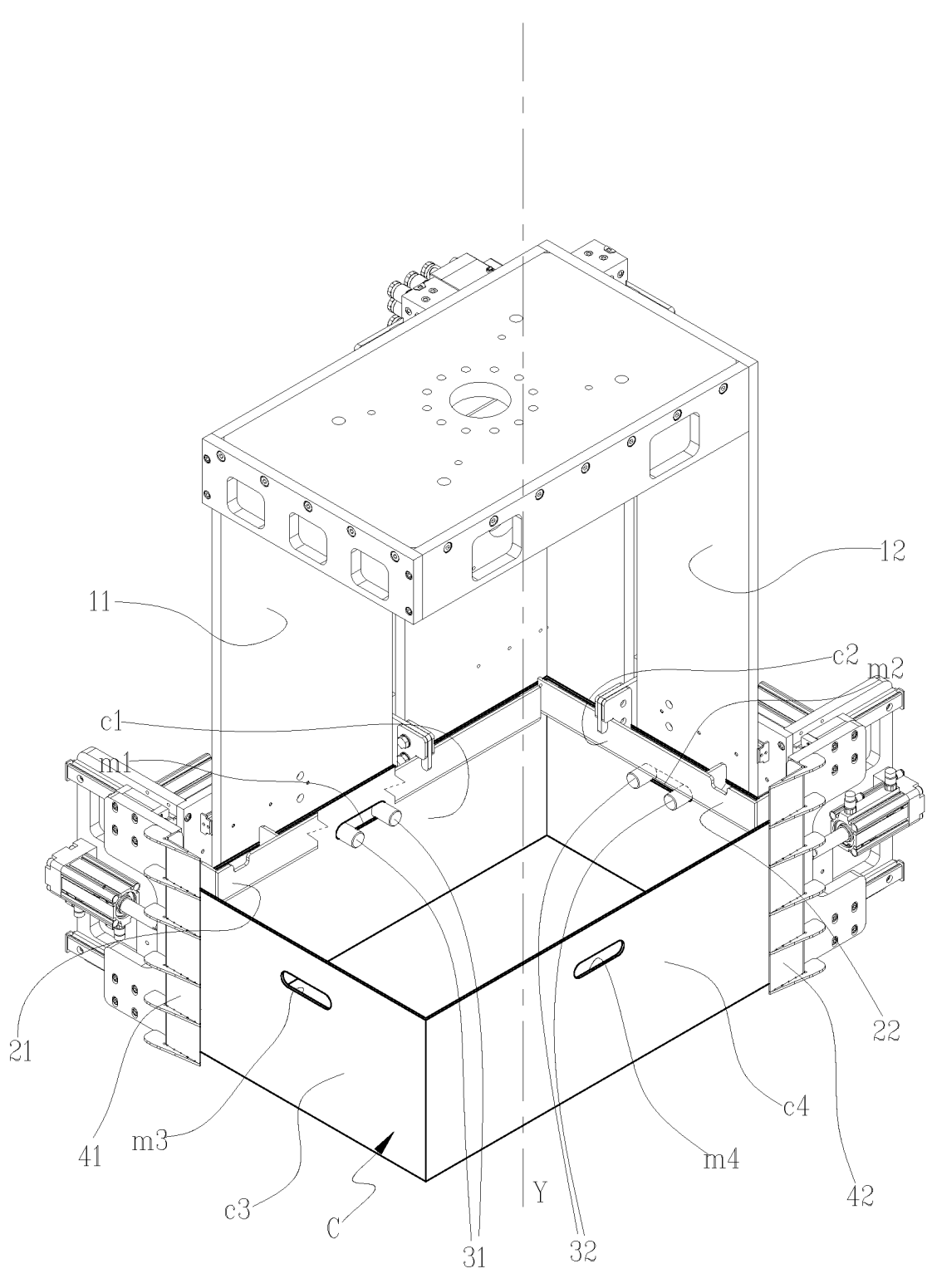

The gripping device further comprises a first presser (21), that is movable along the main direction (Y) between an inactive position, shown in FIG. 2, and an active position, shown in FIGS. 3, 4 and 5, spaced apart from the inactive position for an activation stroke. Advantageously, the activation stroke is adjustable to modify the number of stacked together crates (C) that the gripping device can collect.

In the inactive position, the first presser (21) does not interact with a crate (C), or exerts an approach thrust, of a pre-established value, on the free edge of the first panel (c1). In the active position, the first presser (21) presses on the free edge of the first panel (c1), exerting an operating thrust along at least the main direction (Y). The operating thrust is greater than the approach thrust. In one configuration in which the main direction (Y) is vertical, the first presser (21) is arranged to exert a thrust directed downwards.

The gripping device also comprises a second presser (22) that is movable along the main direction (Y) between an inactive position and an active position, spaced apart from the inactive position for an activation stroke. Advantageously, the activation stroke is adjustable to modify the number of crates (C) stacked together that the gripping device can collect. The activation stroke of the second presser occurs in the same direction as the activation stroke of the first presser (21).

In the inactive position, shown in FIG. 2, the second presser (22) does not interact with a crate (C), or exerts an approach thrust of a pre-established value on the free edge of the second panel (c2). In the active position, shown in FIGS. 3, 4 and 5, the second presser (22) presses on the free edge of the second panel (c2), exerting an operating thrust along at least the main direction (Y). The operating thrust is greater than the approach thrust. In one configuration in which the main direction (Y) is vertical, the second presser (22) is arranged to exert a thrust directed downwards, similarly to the first presser (21).

In practice, in order to collect one or more crates (C) that are stacked together, the gripping device is moved close to the crates so that the first and the second abutment (11,12)

approach the first and the second panel (c1,c2). The approach of the first and the second abutment (11,12) is a movement that comprises a component directed horizontally and a component directed vertically downwards. During the approach, the first and the second presser (21,22) are in the inactive position, i.e. they do not come into contact with the free edges of the first and of the second panel (c1,c2), or they come into contact with the latter by exerting the approach thrust. Once the approach position has been reached, the first and the second presser (21,22) move to the active position.

In the preferred but not exclusive embodiment shown, the first presser (21) is slidable along the first abutment (11) between the active position and the inactive position, whereas the second presser (22) is slidable along the second abutment (12) between the active position and the inactive position.

In particular, the first and the second presser (21,22) comprise a respective movable body. The movable body of the first presser (21) is slidable on the first abutment (11), by an actuator of known type that is not shown. This actuator can be located in a rear zone of the first abutment (11), i.e. on the side of the first abutment (11) that is opposite the movable body. Sliding the movable body on the first abutment (11), for example, is obtained by a guide of known type, which is not shown in detail.

Similarly to the first presser (21), the movable body of the second presser (22) is slidable on the second abutment (12), by an actuator of known type, which is not represented. This actuator can be located in a rear zone of the second abutment (12), i.e. on the side of the second abutment (12) that is opposite the movable body. Sliding the movable body on the second abutment (12), for example, is obtained by a guide of known type, which is not shown in detail.

Preferably, the first presser (21), when it is in the active position, is able to press the first panel (c1) towards the first abutment (11). In other words, the first presser (21), by moving to the active position, exerts at least two actions on the first panel (c1), i.e. a thrust directed parallel to the main direction (Y) and a thrust directed towards the first abutment (11). For this purpose, in the embodiment shown, the first presser (21) comprises an active portion (21a) that has at least one active surface, intended to come into contact with the free edge of the first panel (c1). This active surface is so tilted that an acute angle forms between the active surface and the first abutment (11). In this manner, the thrust exerted by the active surface has a component directed parallel to the main direction (Y) and a component perpendicular to the latter, i.e. directed towards the first abutment (11). Similarly to the first presser (21), the second presser (22), when it is in the active position, is able to press the second panel (c2) towards the second abutment (12). In other words, the second presser (22), by moving in the active position, exerts at least two actions on the second panel (c2), i.e. a 30 thrust directed parallel to the main direction (Y) and a thrust directed towards the second abutment (12). For this purpose, in the embodiment shown, the second presser (22) comprises an active portion (22a) that has at least one active surface, intended to come into contact with the upper edge of the second panel (c2). This active surface is so tilted that an acute angle forms between the active surface and the second abutment (12). In this manner, the thrust exerted by the active surface has a component directed parallel to the main direction (Y) and a component perpendicular to the latter, i.e. directed towards the second abutment (12).

Figure 6:
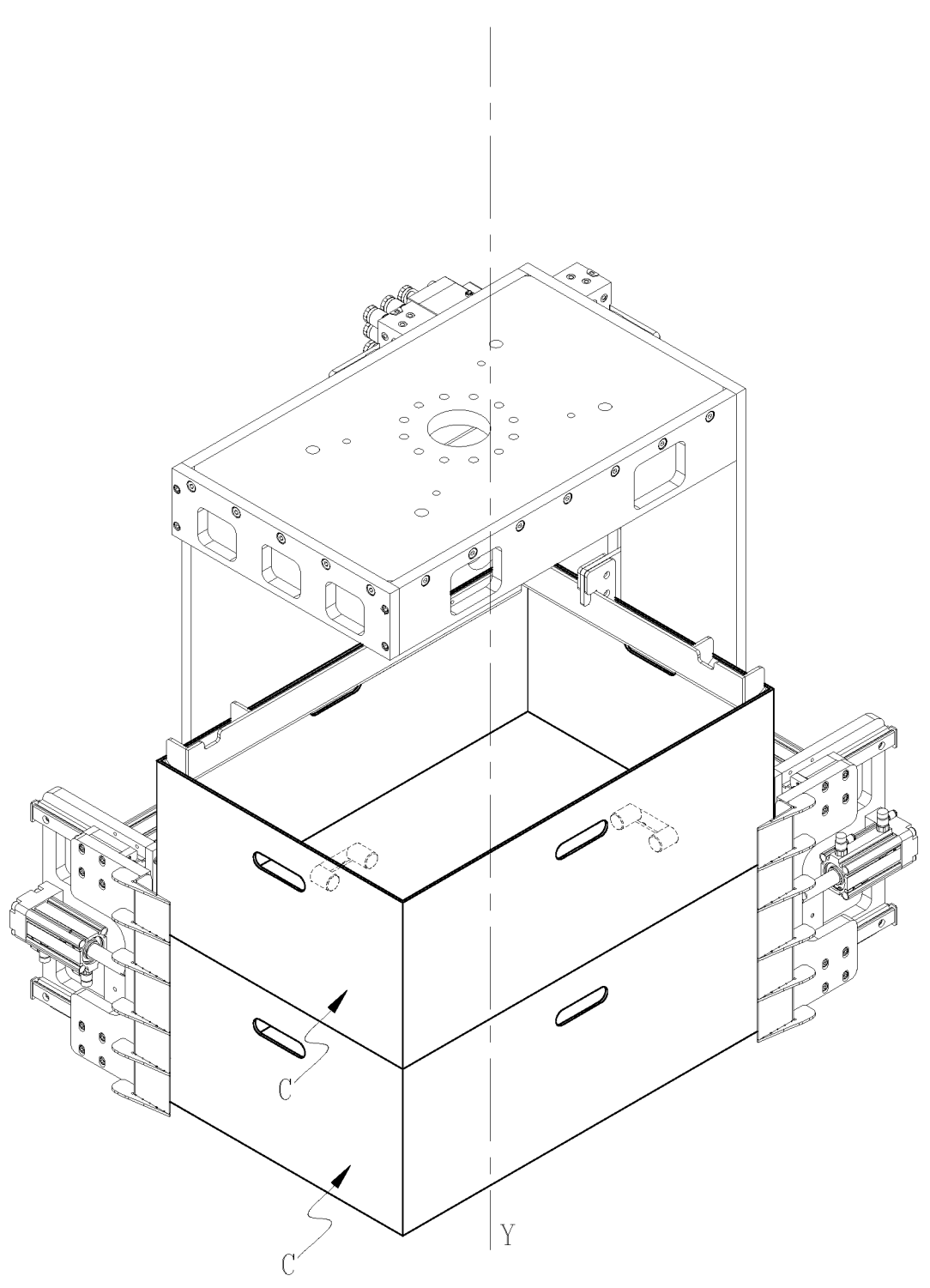
FIG. 6 shows a gripping configuration for gripping two crates that are stacked together.

The gripping device according to the invention is further provided with a first cursor (31), movable along a direction that is transverse to the main direction (Y), relative to the first abutment (11), between an inactive position, shown in FIGS. 2 and 3, and an operating position, shown in FIGS. 4, 5 and 6, that are separated from one another by an activation stroke. In the inactive position, the first cursor (31) does not protrude from the first abutment (11), or protrudes from the latter by an initial portion. In the active position, the first cursor (31) protrudes from the first abutment (11) for a portion of greater extent, substantially equal to the activation stroke, towards the space intended to be occupied by the crates (C). In the inactive position, the first cursor (31) cannot interact with a crate (C).

In the active position, the first cursor (31) is arranged so as to engage with the first panel (c1), to prevent a movement of the first panel (c1) along the main direction (Y).

Substantially, when the first cursor (31) is located in its operating position and the first presser (21) is located in its operating position, the first panel (c1) is locked relative to the movements directed along the main direction (Y). Further, the first panel (c1) is retained by the first presser (21) in contact with the first abutment (11).

In the embodiment shown, the first cursor (31) is structured to be able to be inserted, when it is in the active position, into a handle (m1) located on the first panel (c1) of the crate (C), as shown in FIG. 4. For example, the first cursor (31) comprises a pin shaped to be able to be inserted into the handle (m1), driven slidingly along a direction transverse or perpendicular to the main direction (Y), by an actuator of known type, which is not shown in the figure.

The device according to the present invention further comprises a second cursor (32), movable along a direction that is transverse to the main direction (Y), relative to the second abutment (11), between an inactive position, shown in FIGS. 2 and 3, and an operating position, shown in FIGS. 4, 5 and 6, which are separated from one another by an activation stroke. In the inactive position, the second cursor (32) does not protrude from the second abutment (12), or protrudes from the latter for an initial portion. In the active position, the second cursor (32) protrudes from the second abutment (12) for a portion of greater extent, substantially equal to the activation stroke, towards the space intended to be occupied by the crates (C).

In the inactive position, the second cursor (32) cannot interact with a crate (C). In the active position, the second cursor (32) is arranged so as to engage with the second panel (c2), to prevent a movement of the second panel (c2) along the main direction (Y).

Substantially, when the second cursor (32) is located in its operating position and the second presser (22) is located in its operating position, the second panel (c2) is locked relative to the movements directed along the main direction (Y). Further, the second panel (c2) is retained by the second presser (22) in contact with the second abutment (12).

In the embodiment shown, the second cursor (32) is structured to be able to be inserted, when it is in the active position, into a handle (m2) located on the second panel (c2) of the crate (C), as shown in FIG. 4. For example, the second cursor (32) comprises a pin shaped to be able to be inserted into the handle (m2), driven slidingly along a direction transverse or perpendicular to the main direction (Y), by an actuator of known type, which is not shown in the figure.

Gripping one crate (C) or several crates (C) that are stacked together occurs in the following manner.

Starting from an initial configuration, in which the pressers (21,22) and the cursors (31,32) are in the inactive position, the gripping device approaches the crate (C) or the stack of crates (C), until the first and the second abutment (11,12) are brought near the first panel (c1) and the second panel (c2) of the crate (C), or of the stack of crates (C). In this latter case, in fact, the stacked crates have the first panels (c1) and the second panels (c2) aligned and mutually coplanar, as shown in FIG. 6. The desired approach position can be identified by sensors of optical type and/or by proximity sensors and/or by probe sensors that are known to the person skilled in the art.

Once the approach position has been reached, the first and the second presser (21,22) move to the active position, simultaneously or in a predetermined sequence. Simultaneously with or subsequently to the pressers (21,22), the cursors (31,32) move to the respective active positions. The first cursor (31) is inserted into the handle (m1) of the first panel (c1). The second cursor (32) is inserted into the handle (m2) of the second panel (C). With the pressers (21,22) and the cursors (31,32) in the respective active positions, the crate (C) is substantially locked in contact with the abutments (11,12), unless there is a possible deformation of the crate (C) that tends to lower the corner that is most distant from the abutments (11,12), through the effect of the weight. If a stack of crates is gripped, the pressers (21,22) are arranged in contact with the panels (c1,c2) of the upper crate of the stack, whilst the cursors (31,32) are engaged on the panels (c1,c2) of the lower crate of the stack. In particular, in the embodiment shown, the two cursors (31,32) are inserted into the handles (m1,m2) of the respective panels.

By adjusting the stroke of the pressers (21,22) relative to the position of the cursors (31,32), it is possible to vary the number of stacked crates (C) that can be collected simultaneously. For this purpose, the gripping device according to the present invention is connected to a control module that, by an appropriate algorithm, controls the pressers (21,22) and the cursors (31,32). The dimensions of the crates (C), and in particular the height of the panels (c1,c2,c3,c4) being known, the control module adjusts the stroke of the pressers (21,22) from the inactive position to the active position, on the basis of the number of crates to be collected. The control action exerted by the control module is assisted by the signals processed and transmitted by the sensors assigned to identifying the approach position. The activation strokes can be adjusted by the control module as a function of the dimensions of the crates, which can be stored and used via the control algorithm, and/or via further sensors of known type, associated with the gripping device so as to detect, in real time, the positions of the panels (c1, c2) and of the handles (m1, m2) if present. In order to release the crates, the sequence of movements is substantially the contrary of the sequence described for picking up. In particular, the crate or the crates (C) that are supported by the gripping device are rested on the destination surface, which could be a plane or another crate or stack of crates. Once the envisaged support has been reached, which can be detected by sensors known to the person skilled in the art, for example of optical, pressure, proximity or another type, the cursors (31,32) move from the active position to the inactive position. In the inactive position of the cursors (31,32), the crates (C) are no longer supported and thus remain on the provided support. If the gripping device is supporting several stacked crates (C), it is possible to release only one part of the crates. For this purpose, after depositing the crates resting on the set destination and after moving the cursors (31,32) to the inactive position, the gripping device can be lifted up to the height of the crate or crates that are not to be released. The correct height can be identified by the same sensors that are already disclosed relative to positioning of the gripping device during the collecting step. When the correct height has been reached, the cursors (31,32) and the pressers (21,22) can be moved again to the respective active positions, to grip the crates (C) to be taken elsewhere. The gripping device can also be raised to the height set for collecting the crates to be taken elsewhere by maintaining the pressers (21,22) in contact with the panels of the upper crate of the stack, and sliding the abutments (11,12) relative to the pressers (21,22), for example by lifting by the robotic arm or another movement device with which the gripping device is associated The possibility of collecting one or more crates (C) that are stacked together enables the productivity and flexibility of the gripping device according to the present invention to be increased significantly. The gripping device according to the present invention further comprises a first stabiliser (41), which is movable between an inactive position, shown in FIGS. 2, 3 and 4, in which it is not placed in front of the second abutment (12), and an active position, shown in FIGS. 5 and 6, in which it is placed in front of the second abutment (12), i.e. the projection of at least one portion of the first stabiliser (41) on the second abutment (12) has a non-nil area. In other words, in the active position the first stabiliser (41) is in a position opposite the second abutment (12), whereas in an inactive position it is not in a position opposite the second abutment (12). In the active position, the first stabiliser (41) is able to maintain or press a crate (C) in contact with the second abutment (12), i.e. is able to exert a push that presses and/or maintains a crate (C) in contact with the second abutment. In these conditions, the first stabiliser (41) substantially assists in the action exerted by the second presser (22) and by the second cursor (32) in the respective active positions. In practice, the first stabiliser maintains the crate (C) in a substantially horizontal position, preventing the latter from tilting downwards, particularly in the corner zone that is furthest from the gripping device. When it is in the inactive position, the first stabiliser (41) does not hinder the approach of the first and the second abutment (11,12) to the crate (C).

In the preferred but not exclusive embodiment shown, the first stabiliser (41) comprises an arm, provided with an operating surface (41a) intended to be arranged in contact with a third panel (c3), opposite the second panel (c2) of a crate (C). The first stabiliser (41) is associated with the first abutment (11) and is movable relative to the first abutment (11) between the active position and the inactive position, by an actuator of known type that is not shown in the figure. Preferably, the movement of the first stabiliser (41) between the active and inactive positions comprises at least one component directed on a plane parallel to the plane of the second abutment (12), and at least one component directed perpendicularly to the second abutment (12). By moving near the second abutment (12), along a direction that is perpendicular to the latter, the first stabiliser presses the crate (C) towards the second abutment (12).

The gripping device also comprises a second stabiliser (42), which is movable between an inactive position, shown in FIGS. 2, 3 and 4, in which it is not placed in front of the first abutment (11), and an active position, shown in FIGS. 5 and 6, in which it is placed in front of the first abutment (11), i.e. the projection of at least one portion of the second stabiliser (42) on the second abutment (12) has a non-nil area. In other terms, in the active position the second stabiliser (42) is in a position opposite the first abutment (11), whereas in the inactive position it is not in a position opposite the first abutment (11). Similarly to the first stabiliser (41), the second stabiliser (42), when it is in the active position, is able to exert a thrust that pushes and/or maintains a crate (C) in contact with the first abutment (11). In such conditions, the second stabiliser (42) substantially assists in the action exerted by the first presser (21) and by the first cursor (31) in the respective active positions. In practice, the second stabiliser maintains the crate (C) in a substantially horizontal position, preventing the latter from tilting downwards, particularly in the corner zone that is furthest from the gripping device. When it is in the inactive position, the second stabiliser (42) does not hinder the approach of the first and the second abutment (11,12) to the crate (C).

In the embodiment shown, the second stabiliser (42) comprises an arm, provided with an operating surface (42a) intended to be arranged in contact with a fourth panel (c4), opposite the first panel (c1) of a crate (C). The second stabiliser (42) is associated with the second abutment (12) and is movable relative to the latter between the active position and the inactive position, by an actuator of known type that is not shown in the figure. Preferably, the movement of the second stabiliser (42) between the active and inactive positions comprises at least one component directed on a plane parallel to the plane of the first abutment (11), and at least one component directed perpendicularly to the first abutment (11). By moving the first abutment (11) near, along a direction that is perpendicular to the latter, the second stabiliser presses the crate (C) towards the first abutment (11).

The invention claimed is:

1. A gripping device for crates, comprising a first abutment (11) and a second abutment (12), arranged to be positioned in contact with two panels (c1,c2) of a crate (C), that are adjacent and perpendicular to one another, the device comprises:

a first presser (21), which is movable along a main direction (Y) between an inactive position and an active position, spaced apart from the inactive position for an activation stroke; in the inactive position, the first presser (21) is not able to interact with a crate (C), or is able to exert an approach thrust, of pre-established value, on a free edge of the first panel (c1); in the active position, the first presser (21) is able to press on the free edge of the first panel (c1), exerting an operating thrust along at least the main direction (Y);

a second presser (22), that is movable along the main direction (Y) between an inactive position and an active position, spaced apart from the inactive position for an activation stroke; in the inactive position, the second presser (22) is not able to interact with a crate (C), or is able to exert an approach thrust, of pre-established value, on the free edge of the second panel (c2); in the active position, the second presser (22) is able to press on the free edge of the second panel (c2), exerting an operating thrust along at least the main direction (Y);

a first cursor (31), movable along a direction that is transverse to the main direction (Y), relative to the first abutment (11), between an inactive position and an operating position, which are separated from one another by an activation stroke; in the inactive position, the first cursor (31) is not able to interact with a crate (C); in the operating position, the first cursor (31) is able to engage with the first panel (c1), to prevent a movement of the first panel (c1) along the main direction (Y);

a second cursor (32), movable along a direction that is transverse to the main direction (Y), relative to the second abutment (11), between an inactive position and an operating position, which are separated from one another by an activation stroke; in the inactive position, the second cursor (32) is not able to interact with a crate (C); in the operating position, the second cursor (32) is able to engage with the second panel (c2), to prevent a movement of the second panel (c2) along the main direction (Y), wherein the first presser (21) and the second presser (22) are arranged perpendicular to one another along the main direction (Y).

2. The gripping device according to claim 1, wherein:

in the inactive position, the first cursor (31) does not protrude from the first abutment (11), or protrudes from the latter for an initial portion; in the active position, the first cursor (31) protrudes from the first abutment (11) for a portion of greater extent, substantially equal to the activation stroke, towards the space occupied by the crates (C);

in the inactive position, the second cursor (32) does not protrude from the second abutment (12), or protrudes from the latter for an initial portion; in the active position, the second cursor (32) protrudes from the second abutment (12) for a portion of greater extent, substantially equal to the activation stroke, towards the space occupied by the crates (C).

3. The gripping device according to claim 2, wherein:

the first cursor (31) is structured to be able to be inserted, when it is in the active position, into a handle (m1) located on the first panel (c1) of the crate (C);

the second cursor (32) is structured to be able to be inserted, when it is in the active position, into a handle (m2) located on the second panel (c2) of the crate (C).

4. The gripping device according to claim 1, wherein:

the first presser (21), when it is in the active position, is able to press the first panel (c1) towards the first abutment (11);

the second cursor (22), when it is in the active position, is able to press the second panel (c2) towards the second abutment (12).

5. The gripping device according to claim 1, comprising:

a first stabiliser (41), which is movable between an inactive position, in which it is not placed in front of the second abutment (12), and an active position, in which the first stabiliser is placed in front of the second abutment (12), so as to be able to maintain or press a crate (C) in contact with the second abutment (12);

a second stabiliser (42), which is movable between an inactive position, in which it is not placed in front of the first abutment (11), and an active position, in which the second stabiliser is placed in front of the first abutment (11), so as to be able to maintain or press a crate (C) in contact with the first abutment (11).

6. The gripping device according to claim 5, wherein:

the first stabiliser (41) comprises an arm, provided with an operating surface (41a) configured to contact a third panel (c3) of a crate (C);

the second stabiliser (42) comprises an arm, provided with an operating surface (42a) configured to contact with a fourth panel (c4) of a crate (C).

7. The gripping device according to claim 6, wherein:

the first stabiliser (41) is associated with the first abutment (11) and is movable relative to the first abutment (11) between the active position and the inactive position;

the second stabiliser (42) is associated with the second abutment (12) and is movable relative to the second abutment (11) between the active position and the inactive position.

8. The device according to claim 7, wherein:

the movement of the first stabiliser (41) between the active and inactive positions comprises at least one component directed on a plane parallel to the plane of the second abutment (12), and at least one component directed perpendicularly to the second abutment (12);

the movement of the second stabiliser (42) between the active and inactive positions comprises at least one component directed on a plane parallel to the plane of the first abutment (11), and at least one component directed perpendicularly to the first abutment (11).

9. The gripping device according to claim 1, wherein:

the first cursor (31) and the second cursor (32) are arranged perpendicular to one another along the main direction (Y).

\*    \*    \*    \*    \*